United States Patent
LeCroy et al.

(10) Patent No.: US 6,557,724 B1
(45) Date of Patent: May 6, 2003

(54) VERTICAL CONVEYOR

(75) Inventors: Donald LeCroy, Mableton, GA (US); Donald L. Anderson, Brighton, MI (US); Christopher J. Murphy, Ann Arbor, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 0 days.

(21) Appl. No.: 09/651,599

(22) Filed: Aug. 30, 2000

(51) Int. Cl.$^7$ .......................... G07F 11/00; B65G 47/26; B65G 47/38; B65G 47/34; B65G 47/84
(52) U.S. Cl. ....................... 221/76; 198/435; 198/463.3
(58) Field of Search ............................. 198/435, 463.3, 198/592; 221/75, 76; 193/27, 28, 35 R, 38, 40

(56) References Cited

U.S. PATENT DOCUMENTS

| | | |
|---|---|---|
| 342,433 A | 5/1886 | Fischer |
| 409,806 A | 8/1889 | Schureman |
| 1,034,618 A | 8/1912 | Holcombe |
| 3,437,235 A | 4/1969 | Guerra |
| 3,817,368 A | 6/1974 | Wentz et al. |
| 4,307,988 A | 12/1981 | Page et al. |
| 4,485,910 A * | 12/1984 | Tabler ...................... 193/36 X |
| 4,752,175 A | 6/1988 | Lichti |
| 5,111,963 A | 5/1992 | Grace, Sr. |
| 5,236,104 A * | 8/1993 | Stingel, Jr. et al. ....... 221/75 X |
| 5,285,928 A | 2/1994 | Stingel, Jr. et al. |
| 5,601,395 A | 2/1997 | Lichti, Sr. et al. |
| 5,711,410 A | 1/1998 | Cai et al. |
| 5,816,383 A | 10/1998 | Maier et al. |
| 5,860,504 A | 1/1999 | Lazzarotti |
| 6,105,751 A | 8/2000 | Jentjens et al. |

FOREIGN PATENT DOCUMENTS

| | | |
|---|---|---|
| DE | 43 23 566 | 1/1995 |
| WO | WO97/33820 | 9/1997 |

OTHER PUBLICATIONS

Webb VSort Brochure—Technical Specifications, Jervis B. Webb Company, 2000 (2 pages).
Webb VSort Brochure—Baggage Sorting Conveyor, Jervis B. Webb Company, 2000 (2 pages).

* cited by examiner

Primary Examiner—Christopher P. Ellis
Assistant Examiner—Gene O. Crawford
(74) Attorney, Agent, or Firm—Dickinson Wright PLLC

(57) ABSTRACT

A vertical conveyor including first and second conveyors having first and second ends. The first conveyor is vertically aligned with and above the second conveyor. The vertical conveyor also includes a third conveyor having a free end and a coupled end. The third conveyor is pivotable about its coupled end to permit movement of its free end between a raised position and a lowered position and includes a reversible drive operable in a first direction to move an article toward the coupled end and in a second direction to move an article toward the free end. The free end is operably aligned with the first end of the first conveyor when the free end is in its raised position and operably aligned with the first end of the second conveyor when the free end is in its lowered position. The invention is also directed to a method of moving articles through a vertical conveyor that includes first, second, and third conveyors. The first conveyor is vertically aligned with the third conveyor and the second conveyor includes a free end and a coupled end. The method includes the steps of conveying the article from the first conveyor onto the second conveyor, pivoting the second conveyor into alignment with the third conveyor, and conveying the article from the second conveyor onto the third conveyor.

29 Claims, 5 Drawing Sheets

VERTICAL CONVEYOR

BACKGROUND OF THE INVENTION

1. Technical Field

The present invention relates generally to a vertical conveyor for changing the elevation of articles and, more particularly, to a reversible vertical conveyor that raises or lowers the articles.

2. Discussion

Vertical conveyors are commonly used to transport a variety of articles in vertically upward and downward directions. For example, bales of hay are lifted and lowered from lofts, workpieces and parts are moved from storage to manufacturing areas, and baggage is moved from airport check-in counters to the complex conveyor system that delivers the baggage to the appropriate airplane. Conveyor designs are commonly specifically tailored for a particular application and therefore vary widely in their structure and operation. Unfortunately, presently available vertical conveyors have numerous deficiencies, including the inability to effectively sort conveyed articles as well as requiring undue floor space. Space restraints, particularly in airport baggage handling applications, have become increasingly important.

SUMMARY OF THE INVENTION

In view of the above, a need exists for a vertical conveyor having relatively small space requirements and, preferably, for a conveyor that is capable of moving articles in an upwardly and downwardly direction as well as to effectively sort articles as they are transported through the conveyor.

Accordingly, the present invention is directed to a vertical conveyor including first and second conveyors having first and second ends. The first conveyor is vertically aligned with and above the second conveyor. The vertical conveyor also includes a third conveyor having a free end and a coupled end. The third conveyor is pivotable about its coupled end to permit movement of its free end between a raised position and a lowered position and includes a reversible drive operable in a first direction to move an article toward the coupled end and in a second direction to move an article toward the free end. The free end is operably aligned with the first end of the first conveyor when the free end is in its raised position and operably aligned with the first end of the second conveyor when the free end is in its lowered position. The invention is also directed to a method of moving articles through a vertical conveyor that includes first, second, and third conveyors. The first conveyor is vertically aligned with the third conveyor and the second conveyor includes a free end and a coupled end. The method includes the steps of conveying the article from the first conveyor onto the second conveyor, pivoting the second conveyor into alignment with the third conveyor, and conveying the article from the second conveyor onto the third conveyor.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
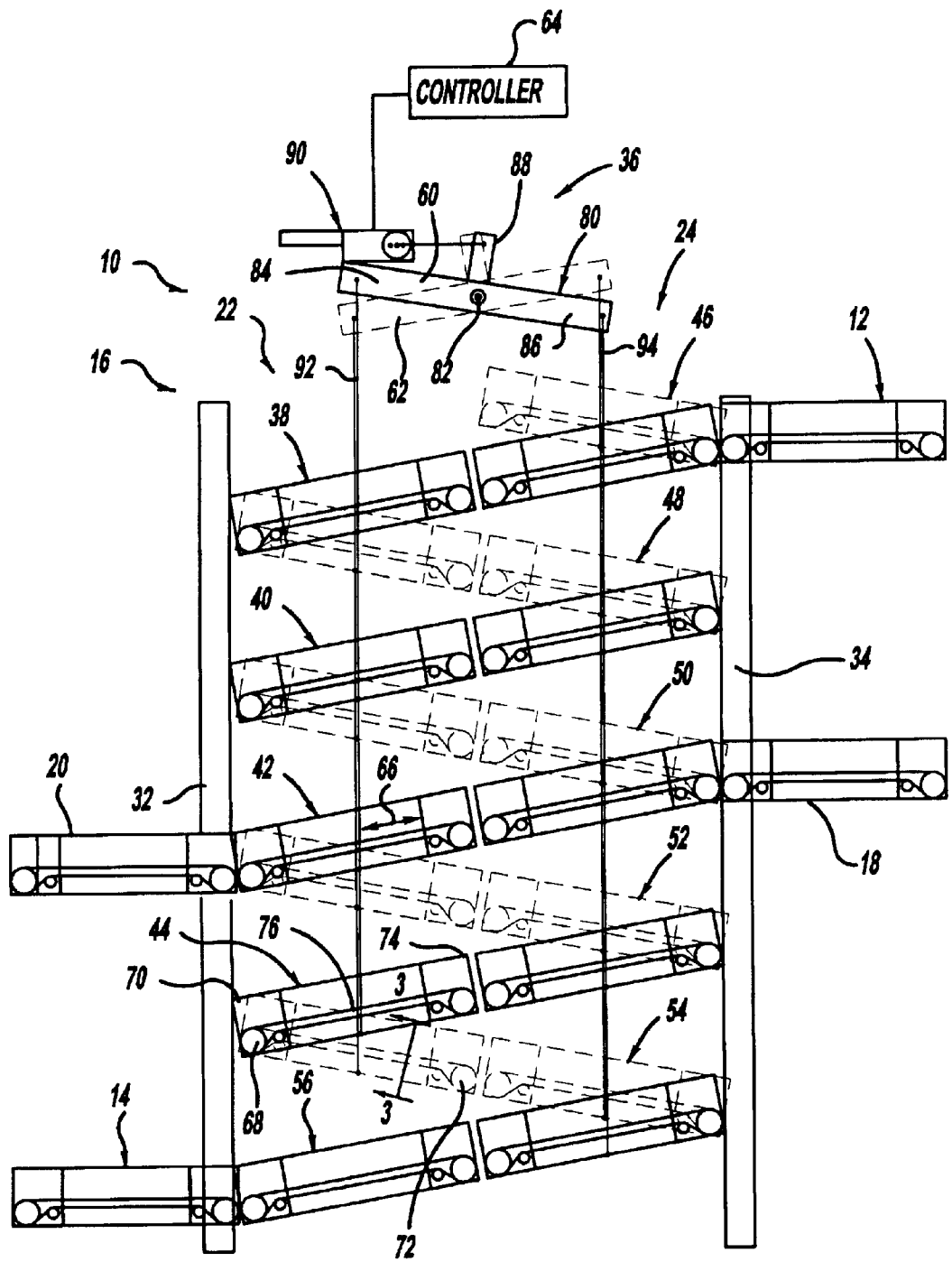
FIG. 1 is a front elevational view of a conveyor assembly according to the present invention.
Figure 2:
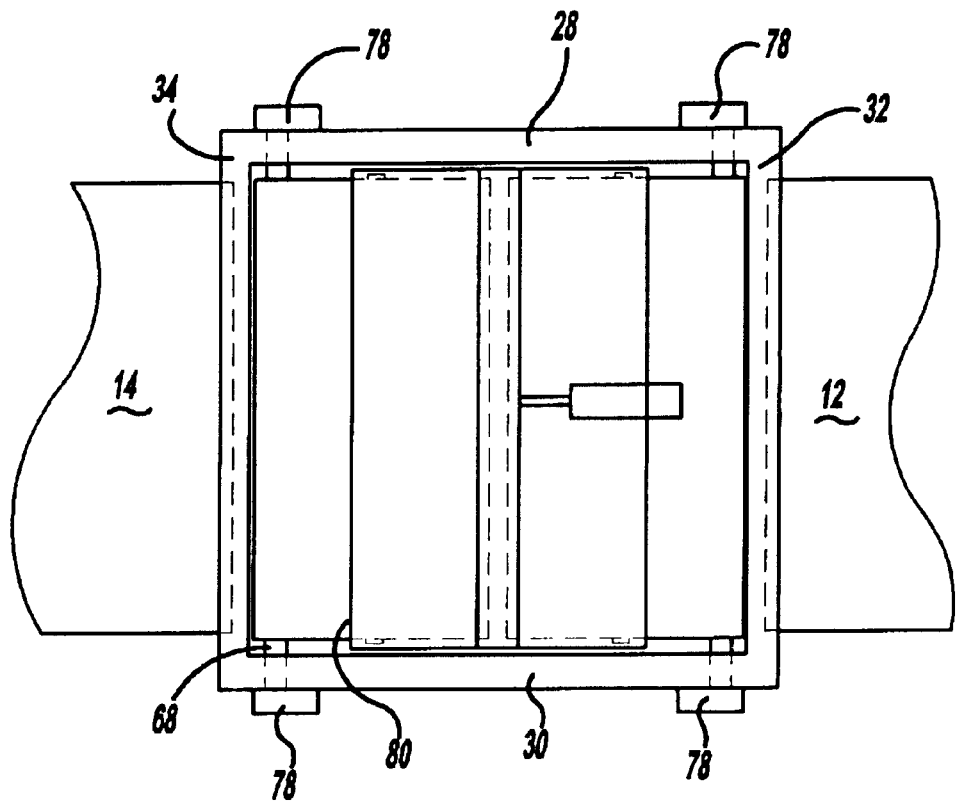
FIG. 2 is a top plan view of the conveyor assembly shown in FIG. 1.
Figure 3:
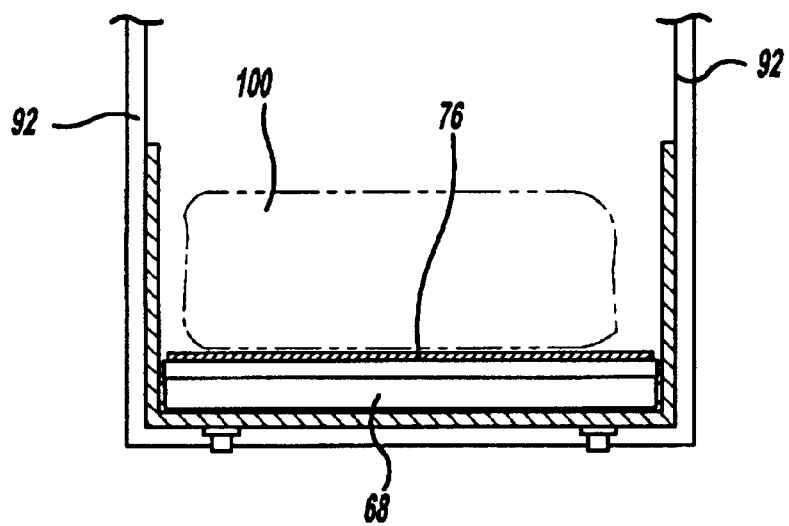
FIG. 3 is a sectional view of a reversible conveyor taken along the line 3—3 shown in FIG. 1.

FIGS. 1–3 show a conveyor assembly according to the present invention which includes an upper feed conveyor 12, a lower feed conveyor 14, and a vertical conveyor 16 interconnecting the feed conveyors to move articles therebetween. The conveyor assembly 10 is also illustrated to include intermediate sorting conveyors 18 and 20 positioned between the upper and lower feed conveyors. It should be appreciated that while the upper and lower conveyors 12 and 14 are referred to as "feed" conveyors, the conveyors may feed articles to, or discharge articles from, the vertical conveyor 16. The intermediate sorting conveyors 18 and 20 may also act as feed or discharge conveyors.

Vertical conveyor 16 generally includes a plurality of reversible belt conveyors vertically aligned in first and second columns 22 and 24. The conveyor columns are supported by an enclosure 26 that can include virtually any configuration and is illustrated as having a front wall 28, a rear wall 30, and side walls 32 and 34 (FIG. 2). An articulating mechanism 36 is coupled to the conveyors in each of the first and second columns 22 and 24 to selectively move the conveyors between raised and lowered positions to facilitate movement of an article through conveyor 16. More particularly, the conveyors in the first column 22, designated by reference numerals 38, 40, 42, and 44 are pivotally coupled to the enclosure 26 such as adjacent to side wall 32 for pivoting movement between raised positions (solid lines) and lowered positions (shown in shadow). Similarly, the conveyors 46, 48, 50, 52, and 54 of the second conveyor column 24 are vertically aligned and pivotally coupled adjacent the side wall 34 to move between raised positions (shown in shadow) and lowered position (solid lines). The articulating mechanism 36 is movable between a first position 60 (solid lines) and a second position 62 (shown in shadow) and coupled to each of the conveyors 38–54 to move the conveyors in the first column 22 between their raised and lowered positions and the conveyors in the second column 24 between their lowered and raised positions.

A controller 64 communicates with the articulating mechanism 36 and the drive motors for each of the conveyors 12, 14, 18, 20, and 38–56, as well as an array of sensors, to synchronously move the conveyors within each of the first and second columns 22 and 24. The vertical conveyor assembly 10 of the present invention presents a much more compact footprint than conventional vertical conveyors while effectively passing articles between floors of a building. Additionally, the invention is operable to raise or lower the articles and to function as a sorting device capable of discharging articles or receiving articles from any level over the unit's elevation.

Each of the pivoting conveyors 38–54, as well as the stationary conveyor 56 at the bottom of the first column 22, are preferably reversible belt conveyors capable of conveying an article in opposed directions as indicated by double ended arrow 66. Each conveyor is illustrated to include a drive pulley 68 at a coupled end 70 of each conveyor, an idler pulley 72 at a free end 74 thereof, and an endless belt 76 operatively coupled to the drive and idler pulleys. The drive pulley 68 is coupled for rotation relative to the side walls 28 and 30 and is driven by reversible drive motors 78 (FIG. 2). Those skilled in the art will appreciate that reversible belt conveyors of the type described herein are generally known in the art and, further, that a variety of alternative conveyors, belt driven and otherwise, capable of moving an article in opposed directions along the conveyor either with or against forces of gravity may be used in the present invention without departing from the scope thereof as defined by the appended claims.

As shown in FIG. 1, the articulating mechanism 36 includes a crank arm 80 that is rotatable about a pivot 82 between the first and second positions 60 and 62. The crank arm 80 includes first and second lateral segments 84 and 86 and a shoulder 88. The shoulder is coupled for movement with an articulating drive 90 to move the crank arm 80 between the first and second positions 60 and 62. A connecting rod 92 interconnects the first segment 84 of the crank arm 80 to the pivoting conveyors 38, 40, 42, and 44 in the first conveyor column 22 to move the conveyors between their raised and lowered positions. Similarly, a second connecting rod 94 interconnects the second segment 86 of the crank arm 80 to the conveyors 46, 48, 50, 52, and 54 in the second conveyor column 24 to move these conveyors between their raised and lowered positions. It should be appreciated that while the conveyor 56 is illustrated as a stationary conveyor, this conveyor may also be coupled to the first segment 84 of the crank arm for reciprocation between raised and lowered positions.

By this configuration, all of the pivoting conveyors in the first column 22 are moved in unison with one another between their raised and lowered positions. Similarly, the conveyors in the second column 24 are also moved in unison with one another but in an opposite orientation to the conveyors in the first column 22. Accordingly, when the articulating mechanism is in its first position 60, the conveyors in the first column 22 are in their raised position and the conveyors in the second column 24 are located in their lowered positions. In this configuration, conveyors 38 and 46, 40 and 48, 42 and 50, 44 and 52, and 56 and 54 operatively align with one another in a left-to-right ascending orientation to permit articles to be transferred therebetween. Conversely, when the articulating mechanism 36 is in its second position 62 (shown in shadow) the conveyors in the first and second column align in a left-to-right descending orientation as follows: 38 with 48, 40 with 50, 42 with 52, and 44 with 54. The synchronized movement of all of the conveyors within a column, as well as the simultaneous movement of the conveyors in the first and second columns, permit the vertical conveyor of the present invention to continuously and efficiently move articles between the conveyor columns in an upward or downward direction.

The programmable controller 64 coordinates or synchronizes movement of the articulating member 36 and the individual drive motors 78 for each of the conveyors 38–56 to raise and/or lower articles between the upper and lower feed conveyors 12 and 14, or any number of intermediate sorting conveyors represented by conveyors 18 and 20. While the articulating mechanism 36 preferably mechanically intercouples the conveyors in each of the first and second columns for movement in unison with one another, those skilled in the art will appreciate that the articulating mechanism may include individual articulating drives for each of the conveyors or any number of alternative configurations that will be apparent from this description, the drawings, and appended claims. The programmable controller 64 could then be configured to communicate with and control the operation of the articulating drives to position the individual conveyors in the appropriate raised and lowered positions. Moreover, while the preferred embodiment moves the conveyors in the first and second columns 22 and 24 simultaneously in order to achieve optimum operational efficiencies, sequential yet non-simultaneous movement of the individual conveyors may be used without departing from the scope of the invention defined by the appended claims.

As noted above, the programmable controller 64 communicates with the articulating mechanism 36, the individual conveyor drive motors 78, as well as a plurality of sensors to control movement of the articles through the vertical conveyor 16. Controllers of the type, and having the functional capabilities described herein, are generally known in the art. By way of example, the controller manufactured by Rockwell Automation of Milwaukee, Wis. and distributed under the trade name SLC-500 is representative of controllers having communication, analysis, and control capabilities similar to the controller 64 described herein.

Sensors 96 are positioned throughout the conveyor 16 and communicate with the controller 64 to provide information regarding the position of articles within the conveyor. For exemplary purposes, sensors are shown at the coupled and free ends 70 and 74 of each of the reversible belt conveyors as well as the discharge ends of the feed and sorting conveyors to indicate the arrival of an article at a conveyor, the presence of an article within a conveyor, and/or the discharge of an article from each conveyor. The programmable controller 64 starts or stops the drive motor 78 for each conveyor and moves the articulating mechanism 36 according to the presence or absence of an article in one or more of the conveyors. While any number of sensors generally known in the art, including optical sensors, weight sensors, and the like, may be used with the present invention, it is contemplated that a photoelectric sensor, such as that manufactured by Rockwell Automation, may be particularly suited for use with the present invention. Similarly, the articulating drive 90 can be any number of suitable drives generally known in the art including a variable frequency drive controlled AC motor, a linear actuator, or a servo motor. The exact requirements are determined by the size the system and the speed requirements for the vertical conveyor 16.

During operation of the conveyor assembly, the programmable controller 64 periodically determines, and then preferably maintains the position or location of each article in the conveyor 16 in its memory, so that the articles are properly positioned on each conveyor before the controller moves the conveyors in columns 22 and 24 between their raised and lowered positions. This ensures that when the controller moves the actuating mechanism between its first and second positions, the articles within the vertical conveyor 16 are positioned upon the individual conveyors rather than expanding the free ends of adjacent conveyors where the articles may fall as the conveyors are moved between their raised and lowered positions.

On startup, the programmable controller initializes its memory to learn the initial positions of any articles in the conveyor and to place each article in a proper startup position on each conveyor, such as by the following representative sequence for a typical conveyor 46. The controller first determines via sensor 96c whether conveyor 46 contains an article. If the sensor 96c indicates the presence of an article, the controller drives the conveyor 46 to the right until the article no longer blocks the sensor 96c, and then stops. Conversely, if the sensor 96c does not initially detect an article, the controller drives the conveyor 46 in the direction 102 until sensor 96c detects an article or for a time equivalent to move an article the length of the conveyor. When the sensor 96c detects an article, the controller stops the conveyor 46 and then reverses the drive direction until the sensor 96c no longer detects the article and then stops the conveyor. If the sensor 96c does not detect an article in a predetermined time, the controller stops the conveyor. By this sequence, the controller confirms that no article is present on the conveyor 46 or, if an article is present, positions the article completely on the conveyor. This typical sequence is preferably performed simultaneously on each of the conveyors in the first and second conveyor columns 22 and 24. After this sequence is complete, the articles are properly positioned on the conveyors and the memory of the programmable controller contains the information about the location of the items.

After the programmable controller has been initialized and the articles have been properly positioned on the conveyors, the controller can communicate with the articulating mechanism 36 and the individual conveyor drive motor 78 to move the articles upward or downward through the vertical conveyor 16 and sort the articles as desired. A representative sequence for conveying articles in a descending direction from the upper feed conveyor 12 to the intermediate sorting conveyor 18 will now be described with reference to FIG. 4. In this descending application, articles are metered into the vertical conveyor 16 by the upper feed conveyor 12, preferably at a rate of approximately twenty articles per minute. When the sensor 96a at the discharge end of feed conveyor 12 indicates the arrival of an article 100, the controller confirms that the conveyor 46 is in its lowered position as shown in cell A of FIG. 4 and starts the drive motor 78 for conveyor 46 so long as the sensor 96c at the free end of conveyor 46 is clear. The article 100 is then conveyed along conveyor 46 in the direction of arrow 102. When the article 100 reaches the free end 74 of conveyor 46 (cell B of FIG. 4), the 16 controller 64 determines via sensor 96d whether conveyor 38 has space for the article and, if so, the controller starts the drive motor for conveyor 38. The article 100 is then conveyed from conveyor 46 to conveyor 38 in the direction of arrow 104 as shown in cells B and C of FIG. 4. In these initial stages of the descending article application, the controller 64 maintains the articulating member 36 in its first position and, therefore, the conveyors in the first column 22 in their raised position and the conveyors in the second column 24 in their lowered position. As a result, the conveyors in the first and second columns operably align with one another in the left-to-right ascending orientation shown in cells A, B, and C of FIG. 4.

Figure 4:
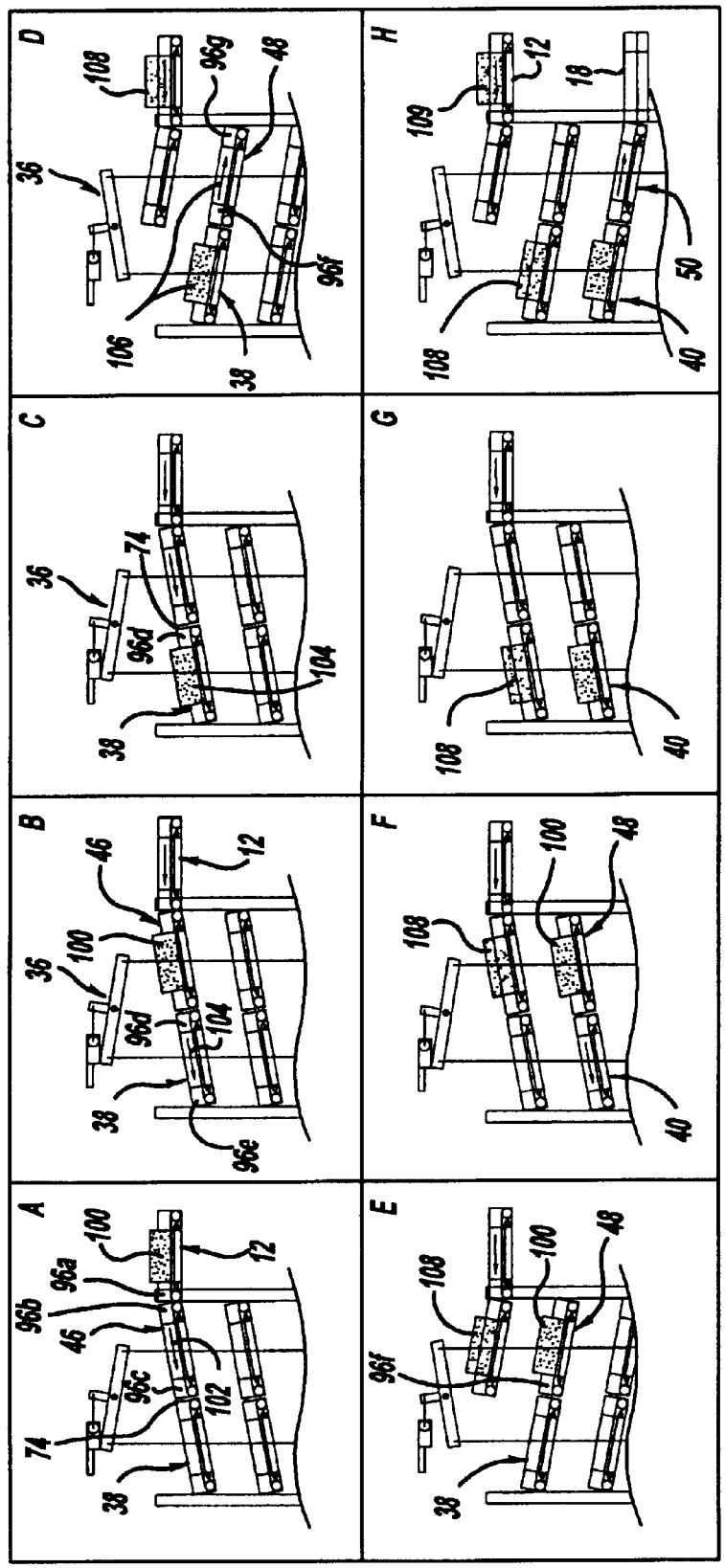
FIG. 4 is a series of partial elevational views similar to that shown in FIG. 1 and illustrating a representative operational sequence of the conveyor assembly.

When the article 100 clears the sensor 96d at the free end 74 of conveyor 38, the controller stops the drive motor 78 for conveyor 38 and moves the articulating mechanism 36 to its second position 62 thereby moving the conveyors in the first column 22 to their lowered position and the conveyors in the second column 24 to their raised position as shown in cell D of FIG. 4. After the articulating mechanism 36 is moved into its second position, the conveyors in the first column 22 and the second column 24 operably align in the left-to-right descending orientation shown in cell D. The controller then reverses the drive direction of drive motor 78 for conveyor 38 and moves the article 100 in the direction of arrows 106 (cell D). When the article reaches the free end 74 of conveyor 38, the controller starts the drive motor for conveyor 48 if the sensor 96f associated with conveyor 48 indicates that there is space within the conveyor to receive the article. After the article clears sensor 96f at the free end of conveyor 48 (cell E), the controller stops the drive motor for conveyor 48 and returns the articulating mechanism 36 to its first position 60 (cell F). This process of stopping and starting drive motors and moving the articulating mechanism between its first and second positions based upon the information provided by the sensors associated with each conveyor is then repeated and the article is conveyed through conveyors 48 (cells E and F), conveyor 40 and 50 (cells G and H), and onto the intermediate sorting conveyor 18.

While the above description referring to FIG. 4 describes the discharge of the article 100 at the intermediate conveyor 18, the article may be conveyed through the entire vertical conveyor and discharged at the lower feed conveyor 14 or discharged at any intermediate conveyor operably aligned with the coupled end of any of the pivoting conveyors 38, 40, 42, 44, 48, 50, 52, or 54. Likewise, the lower feed conveyor 14 or any intermediate conveyor may be used to supply articles to the vertical conveyor 16. Also, the controller 64 may activate the individual conveyor drive motors and move the articulating mechanism 36 to transport the articles upwardly through the vertical conveyor for discharge at any of the intermediate conveyors or the upper feed conveyor 12.

Further, while the description of the operating sequence of the vertical conveyor 16 is illustrated in FIG. 4 with respect to a single article 100, the vertical conveyor is capable of handling multiple articles simultaneously. For example, articles 108 and 109 are shown in cells D–H of FIG. 4. Each of the articles are conveyed through the vertical conveyor 16 in the manner described above. The articles are metered into the vertical conveyor 16 by upper feed conveyor 12 to enter the conveyor 46 when the preceding article enters conveyor 48. As the conveyed articles are commonly not of a constant length, the individual drive motors 78 for each conveyor preferably operate independent of one another. The controller 64 confirms that each of the individual articles on each conveyor has cleared the free ends of each of the individual conveyors prior to moving the articulating mechanism 36.

Figure 5:
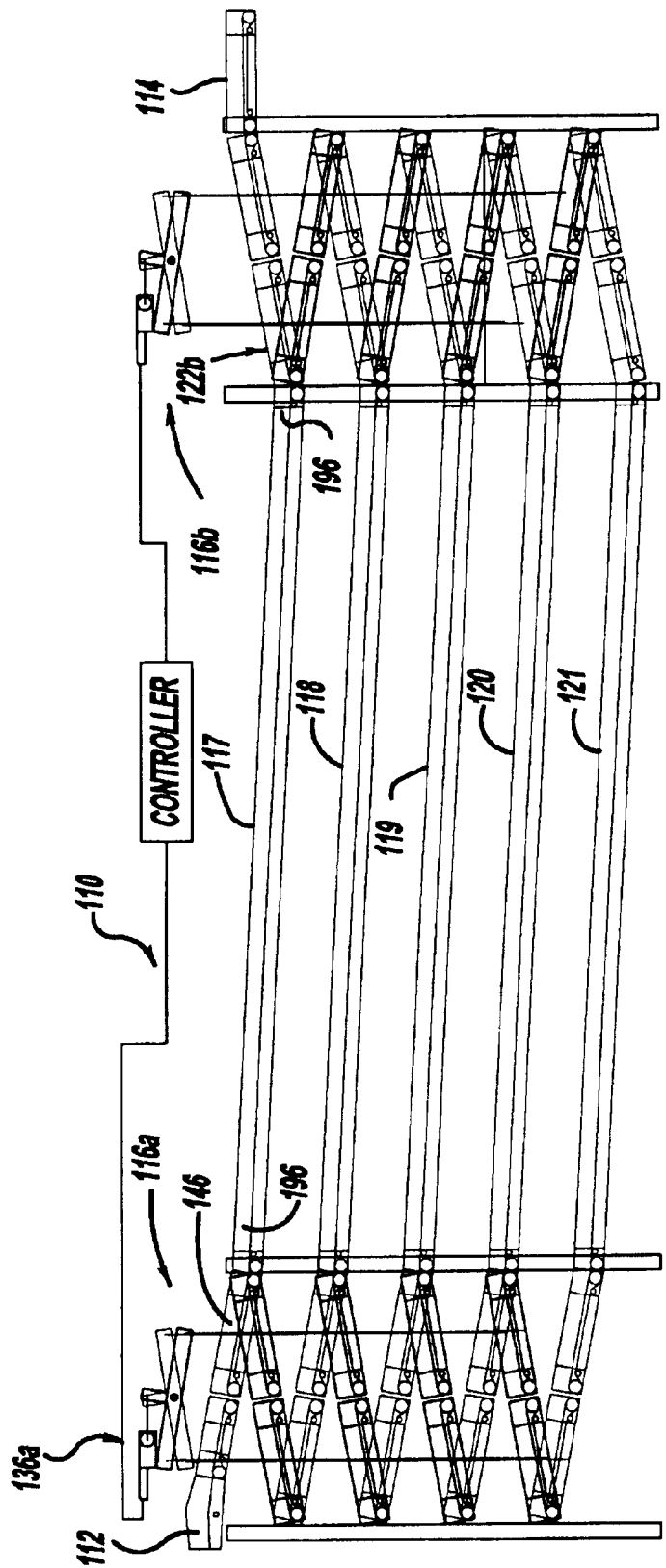
FIG. 5 is an elevational view of an alternative embodiment of the conveyor assembly which includes a pair of vertical conveyors interconnected by storage conveyors for sorting the articles.
Figure 6:
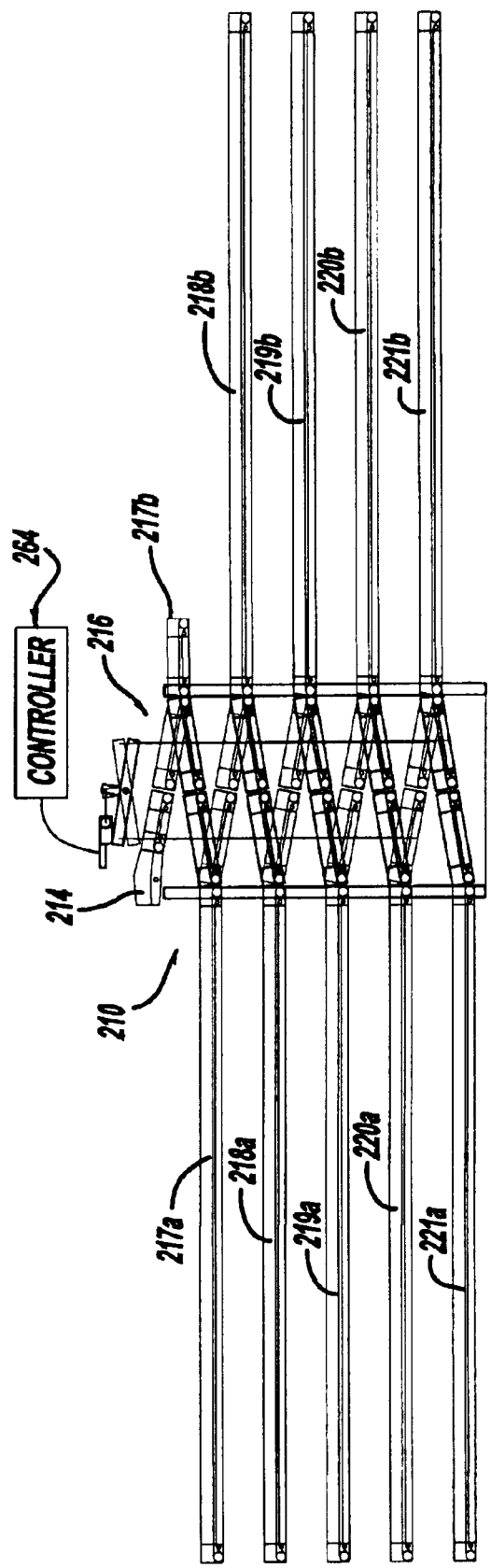
FIG. 6 is an elevational view of another embodiment of the conveyor assembly which includes two sets of sorting conveyors connected to the vertical conveyor.

The sorting capabilities of the conveyor assembly 10 are further illustrated in FIGS. 5 and 6. FIG. 5 illustrates a conveyor assembly 110 having a feed conveyor 112, a discharge conveyor 114, first and second vertical conveyors 116a and 116b, and a set of sorting conveyors 117–121. The sorting conveyors operably interconnect the first and second vertical conveyors along their elevation, provide room to store articles between the conveyors 116a and 116b, and preferably include sensors 196 for communicating information to a controller 164 regarding the position of articles in the sorting conveyors. The feed conveyor 112, through controller 164, meters articles into pivoting conveyor 146a. The controller 164 communicates with the vertical conveyors 116a and 116b, including the articulating mechanisms 136a, 136b and the drive motors for each of the individual pivoting conveyors. Accordingly the controller cam selectively transport the metered articles through vertical conveyor 116a to one or more of the sorting conveyors 117–121.

The sorting conveyors act as vertically separated feed conveyors for the second vertical conveyor 116b. The controller 164 then selectively meters bags from the sorting conveyors 117–121 into one or more of the pivoting conveyors in the first column 122b of the second vertical conveyor 116b. The articles can then be conveyed upward to the discharge conveyor 114.

The sorting conveyors 117–121 may be used as storage lines for articles having a similar characteristic. For example, it is specifically contemplated that the present invention may be used in a baggage handling system for airports where each of the sorting conveyors may be designated to accumulate bags for a particular flight. The controller 146 tracks each bag metered into the first conveyor 116a through the feed conveyor 112 and groups bags with similar destinations or other characteristics along the sorting lines 117–121. The controller 164 may then meter all of the bags from a single sorting line, e.g., line 117, into and through the vertical conveyor 116b so that all bags designated for a particular destination are conveyed in sequence by discharge conveyor 114. Various other sorting techniques readily apparent from the above description may be used to sort articles transported through the vertical conveyor 110.

With respect to FIG. 6, a conveyor assembly 210 includes a vertical conveyor 216 operative in the manner described above and communicating at various elevations with a plurality of sorting conveyors 217a–221a positioned on the left side of the vertical conveyor 216 and a plurality of sorting conveyors 217b–221b positioned on the right side of the vertical conveyor 216. In this application, the vertical conveyor 216 is capable of receiving articles from any of the sorting conveyors and conveying the articles upwardly to an upper discharge conveyor 214. As a result, the conveyor assembly 210 acts as a vertical sorting unit where the controller 264 meters articles into the vertical conveyor 216 based upon characteristics of the articles and moves the articles upwardly through the vertical conveyor 216 to discharge the articles in a sequence that facilitates further handling of the articles. Again, in the context of an airport baggage handling system, the conveyor assembly 210 may be used to group bags based upon their destination point or other criteria to facilitate further handling.

Accordingly, the conveyor assembly of the present invention provides a vertical conveyor operable to raise or lower articles and selectively sort the articles along the elevation of the vertical conveyor 16. The invention includes the conveyor assembly described herein which is capable of vertically transporting vertical articles in an upward or downward direction and sorting the articles through discharge from, and/or metered supply to, the vertical conveyor at multiple levels along the elevation of the vertical conveyor. The invention is also directed to methods of moving one or more ;articles through the vertical conveyor as well as a method of sorting articles transported through the conveyor assembly.

The foregoing discussion discloses and describes an exemplary embodiment of the present invention. One skilled in the art will readily recognize from such discussion, and from the accompanying drawings and claims that various changes, modifications and variations can be made therein without departing from the true spirit.

What is claimed is:

1. A vertical conveyor comprising:

first and second conveyors having first and second ends, said first conveyor being vertically aligned with and above said second conveyor;

a third conveyor having a free end and a coupled end, said third conveyor being pivotable about said coupled end to permit movement of said free end between a raised position and a lowered positioned, said free end being operably aligned with said first end of said first conveyor when said free end is in said raised position, said free end being operably aligned with said first end of said second conveyor when said free end is in said lowered position, said third conveyor having a reversible drive operable in a first direction to move an article toward said coupled end and in a second direction to move an article toward said free end;

a fourth conveyor operably alignable with the second end of the second conveyor;

articulating means operatively coupled to said third conveyor for moving said third conveyor between said raised and lowered positions; and a feed conveyor having an exit end and a discharge conveyor having an entrance end, said discharge conveyor being vertically separated from said feed conveyor, said exit end of said feed conveyor being operably aligned with said second end of one of said first and second conveyors, and the entrance end of said discharge conveyor communicating with the fourth conveyor whereby the vertical conveyor is adapted to convey an article from the feed conveyor to the discharge conveyor by passing the article vertically through at least the first, second, third, and fourth conveyors.

2. The vertical conveyor of claim 1 wherein said articulating means includes an articulating mechanism movable between a first position and second position and wherein said articulating mechanism is coupled to said third conveyor to place said third conveyor in said raised position when said articulating mechanism is in said first position and in said lowered position when said articulating mechanism is in said second position.

3. The vertical conveyor of claim 1 wherein said feed conveyor is vertically above said discharge conveyor, wherein said exit end of said feed conveyor is operably aligned with said second end of said first conveyor, and wherein the entrance end of said discharge conveyor is operably aligned with said fourth conveyor whereby the vertical conveyor is adapted to convey an article from the feed conveyor to the discharge conveyor by passing the article from the feed conveyor to the first conveyor, from the first conveyor to the third conveyor, from the third conveyor to the second conveyor, from the second conveyor to the fourth conveyor and from the fourth conveyor to the discharge conveyor.

4. The vertical conveyor of claim 1 further including a pair of reversible feed conveyors operable in a feed direction and a discharge direction opposite said feed direction and wherein each of said first and second conveyors are reversible conveyors operable in a first direction to move an article toward said first ends and a second direction to move an article toward said second ends.

5. The vertical conveyor of claim 1 further including an articulating mechanism movable between a first position and a second position, wherein said first conveyor is pivotable about said second end between a raised position and a lowered position wherein said first end of said first conveyor is operably aligned with said free end of said third conveyor when said third conveyor is in said raised position, and wherein said articulating mechanism is coupled to said first conveyor and to said third conveyor to place said first conveyor in said lowered position and said third conveyor in said raised position when said articulating mechanism is in said first position and to place said first conveyor in said raised position and said third conveyor in said lowered position when said articulating mechanism is in said second position.

6. The vertical conveyor of claim 5 wherein said feed conveyor is below said discharge conveyor, wherein said exit end of said feed conveyor is operably aligned with said fourth conveyor, and wherein said discharge conveyor is operably aligned with said second end of said first conveyor.

7. The vertical conveyor of claim 5 wherein said articulating mechanism is coupled to said first and third conveyors to synchronously move said first conveyor to said lowered position and said third conveyor to said raised position when said articulating mechanism moves from said second position to said first position.

8. The vertical conveyor of claim 7 further including a sensor coupled to said third conveyor to determine the presence of an article on said third conveyor and a programmable controller communicating with said sensor, said articulating mechanism, and said reversible drive of said third conveyor to selectively move articles between said third conveyor and said first and second conveyors.

9. A vertical conveyor comprising:
   a first conveyor having a free end and a coupled end and being pivotable about said coupled end to move said free end between a raised position and a lowered position;
   a second conveyor being vertically aligned with and below said first conveyor, said second conveyor having a first end and a second end;
   a third conveyor having a free end and a coupled end and being pivotable about said coupled end to move said free end between a raised position and a lowered position;
   a fourth conveyor being vertically aligned with and above said third conveyor, said fourth conveyor having a first end and a second end;
   articulating means operatively coupled to said first and third conveyors for moving said first conveyor and said third conveyor between said raised and lowered positions;
   a feed conveyor having an exit end and a discharge conveyor having an entrance end, said discharge conveyor being vertically separated from said feed conveyor; and
   wherein said free end of said first conveyor is operably aligned with said first end of said fourth conveyor when said first conveyor is in said raised position, wherein said free end of said first conveyor is operably aligned with said free end of said third conveyor when said first conveyor is in said lowered position and said third conveyor is in said raised position, and wherein said free end of said third conveyor is operably aligned with said first end of said second conveyor when said third conveyor is in said lowered position.

10. The vertical conveyor of claim 9 wherein said feed conveyor is above said discharge conveyor, wherein said exit end of said feed conveyor is operably aligned with said second end of said fourth conveyor, and wherein the discharge conveyor is operably aligned with said second end of said second conveyor.

11. The vertical conveyor of claim 9 wherein said first conveyor includes a reversible drive operable in a first direction to move an article toward said coupled end and in a second direction to move an article toward said free end and wherein said third conveyor includes a reversible drive operable in a first direction to move an article toward said coupled end and in a second direction to move an article toward said free end.

12. The vertical conveyor of claim 9 wherein said articulating means includes an articulating mechanism movable between a first position and a second position and wherein said articulating mechanism is coupled to said first conveyor and said third conveyor to place said first conveyor in said lowered position and said third conveyor in said raised position when said articulating mechanism is in said first position and to place said first conveyor in said raised position and said third conveyor in said lowered position when said articulating mechanism is in said second position.

13. The vertical conveyor of claim 12 wherein said articulating mechanism is coupled to said first and third conveyors to simultaneously move said first conveyor to said lowered position and said third conveyor to said raised position as said articulating mechanism moves from said second position to said first position.

14. A vertical conveyor comprising:
   a plurality of first conveyors vertically aligned in a first column, each of said first conveyors having a free end, a coupled end, and a reversible drive operable in a first direction to move an article toward said coupled end and in a second direction to move an article toward said free end, at least one of said first conveyors being pivotable about said coupled end to permit movement of said free end between a raised position and a lowered position;
   a plurality of second conveyors vertically aligned in a second column, each of said second conveyors having a free end and a coupled end, and a reversible drive operable in a first direction to move an article toward said coupled end and in a second direction to move an article toward said free end, at least one of said second conveyors being pivotable about said coupled end to permit movement of said free end between a raised position and a lowered position; and
   a plurality of sorting conveyors each operatively aligned with one of the first or second conveyors and a controller communicating with the first conveyors, the second conveyors, and the sorting conveyors to feed articles to or discharge articles from the sorting conveyors.

15. The vertical conveyor of claim 14 wherein the at least one of said first conveyors is in said lowered position when the at least one of said second conveyors is in said raised position.

16. The vertical conveyor of claim 14 wherein the at least one of said first conveyors is in said raised position when the at least one of said second conveyors is in said lowered position.

17. The vertical conveyor of claim 14 further including an articulating mechanism movable between a first position and a second position, said articulating mechanism being coupled to the at least one of the first conveyors and at least one of the second conveyors to synchronously move the at least one of the first conveyors to the raised position and the at least one of the second conveyors to the lowered position as said articulating mechanism moves from said first position to said second position.

18. A method of moving an article from a feed conveyor, through a vertical conveyor, and to a discharge conveyor vertically spaced from the feed conveyor, the vertical conveyor includes first, second, third, and fourth conveyors, said third conveyor being vertically below said first conveyor, said second conveyor being vertically aligned with said first conveyor and below said third conveyor, said fourth conveyor being vertically aligned with said third conveyor and below said second conveyor, each of said second and third conveyors having a free end and a coupled end, said method comprising:

conveying an article from the feed conveyor to one of the first and fourth conveyors;

conveying the article from said one of the first and fourth conveyors to one of the second and third conveyors;

pivoting said one of the second and third conveyors into alignment with the other of said second and third conveyors;

conveying the article from said one of the second and third conveyors to the other of said one of the second and third conveyors;

conveying the article from the other of said second and third conveyors to the other of said first and fourth conveyors; and conveying the article from the other of said first and fourth conveyors to the discharge conveyor.

19. The method of claim 18 wherein the step of pivoting the third conveyor into alignment with the second conveyor includes pivoting the third conveyor from an inclined position to a declined position.

20. The method of claim 18 wherein the step of pivoting said one of the second and third conveyors into alignment with the other of said second and third conveyors includes pivoting the third conveyor from an inclined position to a declined position.

21. The method of claim 18 wherein the step of conveying the article from the first conveyor onto the third conveyor includes driving the third conveyor in a first direction and wherein the step of conveying the article from the third conveyor to the second conveyor includes driving the third conveyor in a second direction opposite said first direction.

22. The method of claim 18 further including verifying that the third conveyor has space to receive the article prior to conveying the article from the first conveyor onto the third conveyor.

23. The method of claim 18 wherein the article is conveyed from the feed conveyor downward to the discharge conveyor via sequential conveyance to the first conveyor, third conveyor, second conveyor, and fourth conveyor.

24. The method of claim 18 wherein the article is conveyed from the feed conveyor upward to the discharge conveyor via sequential conveyance to the fourth conveyor, second conveyor, third conveyor, and first conveyor.

25. The method of claim 18 further including the steps of pivoting the second conveyor into alignment with the fourth conveyor.

26. The method of claim 25 wherein the step of pivoting the second conveyor into alignment with the fourth conveyor includes pivoting the second conveyor from an inclined position to a declined position.

27. The method of claim 26 further including the steps of pivoting the third conveyor into alignment with the second conveyor by pivoting the third conveyor from an inclined position to a declined position and pivoting the second conveyor from a declined position to an inclined position to operably align the second and third conveyors.

28. The method of claim 27 further including simultaneously pivoting the third conveyor into its declined position and the second conveyor into its inclined position.

29. A sorting conveyor comprising:

a feed conveyor;

a first vertical conveyor including a plurality of first conveyors vertically aligned in a first column, each of said first conveyors having a free end, a coupled end, and a reversible drive operable in a first direction to move an article toward said coupled end and in a second direction to move an article toward said free end, at least one of said first conveyors being pivotable about said coupled end to permit movement of said free end between a raised position and a lowered position, one of said first conveyors being aligned with said feed conveyor to receive articles for transport through said first vertical conveyor, and a plurality of second conveyors vertically aligned in a second column, each of said second conveyors having a free end and a coupled end, and a reversible drive operable in a first direction to move an article toward said coupled end and in a second direction to move an article toward said free end, at least one of said second conveyors being pivotable about said coupled end to permit movement of said free end between a raised position and a lowered position;

a plurality of sorting conveyors each communicating with the coupled end of one of said plurality of second conveyors;

a second vertical conveyor including a plurality of third conveyors vertically aligned in a first column, each of said third conveyors having a free end, a coupled end, and a reversible drive operable in a first direction to move an article toward said coupled end and in a second direction to move an article toward said free end, at least one of said third conveyors being pivotable about said coupled end to permit movement of said free end between a raised position and a lowered position, said third conveyors being aligned with said sorting conveyors to receive articles for transport through said second vertical conveyor, and a plurality of fourth conveyors vertically aligned in a second column, each of said fourth conveyors having a free end and a coupled end, and a reversible drive operable in a first direction to move an article toward said coupled end and in a second direction to move an article toward said free end, at least one of said fourth conveyors being pivotable about said coupled end to permit movement of said free end between a raised position and a lowered position; and a discharge conveyor communicating with the coupled end of one of said plurality of fourth conveyors.

* * * * *